(12) United States Patent
Mandigo et al.

(10) Patent No.: US 10,203,923 B2
(45) Date of Patent: Feb. 12, 2019

(54) LINKING A ROAMING DEVICE TO A NETWORK-ENABLED RESOURCE THROUGH A CLOUD SERVICE USING AN ADDRESS OBTAINED THROUGH A LOCAL INTERACTION

(71) Applicant: HEWLETT-PACKARD DEVELOPMENT COMPANY, L.P., Fort Collins, CO (US)

(72) Inventors: Lonnie D. Mandigo, Corvallis, OR (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 14/764,896

(22) PCT Filed: Jan. 31, 2013

(86) PCT No.: PCT/US2013/024109
§ 371 (c)(1),
(2) Date: Jul. 30, 2015

(87) PCT Pub. No.: WO2014/120198
PCT Pub. Date: Aug. 7, 2014

(65) Prior Publication Data
US 2015/0378658 A1  Dec. 31, 2015

(51) Int. Cl.
*G06F 3/12* (2006.01)
*H04L 29/08* (2006.01)
*H04L 29/12* (2006.01)

(52) U.S. Cl.
CPC .......... *G06F 3/1292* (2013.01); *G06F 3/1204* (2013.01); *G06F 3/1224* (2013.01); *G06F 3/1236* (2013.01); *H04L 67/141* (2013.01); *H04L 67/16* (2013.01); *H04L 61/30* (2013.01)

(58) Field of Classification Search
CPC . H04L 63/0892; H04L 67/16; H04L 63/0876; H04L 63/18; G06F 17/2247; G06F 17/30864; G06F 15/16
USPC .......................................... 709/229; 370/331
See application file for complete search history.

(56) References Cited

U.S. PATENT DOCUMENTS

| | | | | |
|---|---|---|---|---|
| 7,613,454 B2 * | 11/2009 | Zhang | ..................... | H04W 8/26 455/432.1 |
| 8,131,283 B1 * | 3/2012 | Vargantwar | ........... | H04W 36/14 370/311 |
| 8,406,758 B2 * | 3/2013 | Tagg | ..................... | H04W 48/18 455/432.1 |
| 8,453,220 B2 | 5/2013 | Pizot et al. | | |

(Continued)

OTHER PUBLICATIONS

International Searching Authority, International Search Report & Written Opinion, dated Nov. 7, 2013, 13 pages.

(Continued)

*Primary Examiner* — Tesfay Yohannes
(74) *Attorney, Agent, or Firm* — HP Inc. Patent Department (57) ABSTRACT

A roaming device obtains an identifier for a network-enabled resource as a result of interacting with the network-enabled resource. The roaming device uses the identifier to obtain a link for the network-enabled device through a cloud service. The address is used to access and use the network-enabled resource using the cloud service.

18 Claims, 4 Drawing Sheets

(56) References Cited

U.S. PATENT DOCUMENTS

| | | | |
|---|---|---|---|
| 8,472,946 B2* | 6/2013 | Chan | H04L 12/14 455/406 |
| 8,966,588 B1 | 2/2015 | Pizot et al. | |
| 9,052,861 B1 | 6/2015 | Pizot et al. | |
| 2002/0122199 A1 | 9/2002 | Lomas et al. | |
| 2005/0113113 A1* | 5/2005 | Reed | H04L 51/38 455/456.3 |
| 2008/0270525 A1 | 10/2008 | Thero et al. | |
| 2009/0010434 A1* | 1/2009 | Carles | H04L 63/061 380/255 |
| 2009/0011708 A1 | 1/2009 | Kim et al. | |
| 2009/0278705 A1 | 11/2009 | Chhabra et al. | |
| 2010/0091733 A1* | 4/2010 | Hahn | H04L 63/08 370/331 |
| 2010/0186079 A1 | 7/2010 | Nice et al. | |
| 2011/0176162 A1 | 7/2011 | Kamath et al. | |
| 2013/0132854 A1* | 5/2013 | Raleigh | G06F 3/0482 715/738 |
| 2013/0165093 A1* | 6/2013 | Fighel | H04W 4/16 455/417 |
| 2014/0181527 A1* | 6/2014 | Scolari | H04L 63/126 713/176 |

OTHER PUBLICATIONS

Laurent Pizot et al. (inventors), "Establishing a Secure Connection Between a Print Generation Service and a Base Station Printer," U.S. Appl. No. 13/072,720, filed Mar. 27, 2011, 18 pages.

\* cited by examiner

LINKING A ROAMING DEVICE TO A NETWORK-ENABLED RESOURCE THROUGH A CLOUD SERVICE USING AN ADDRESS OBTAINED THROUGH A LOCAL INTERACTION

BACKGROUND

Devices such as web-enabled printers allow for users to use the Internet to perform print operations from remote locations. For example, ePRINT, a cloud service provided by the Hewlett-Packard Company, enables users to remotely access their printers using devices such as smart-phones, tablets and remotely operated personal computers.

DETAILED DESCRIPTION

Examples described herein enable a roaming device to obtain necessary information for accessing and using a network-enabled resource through a cloud service by interacting with the network-enabled device over a local communication link. Among other benefits, examples such as described reduce or eliminate a need for users to manually enter information into a roaming device (e.g., mobile phone, tablet) in order to address or otherwise access such resources (e.g., web-enabled printers) when roaming away from the local communication link (e.g., wireline, Wireless Fidelity or 802.11 (a), (b), (g) and (n) connection) for that resource.

According to one aspect, a roaming device obtains an identifier for a network-enabled resource as a result of interacting with the network-enabled resource. The roaming device uses the identifier to obtain a link for the network-enabled device through a cloud service. The link is used to access and use the network-enabled resource over the Internet.

In another example, a roaming device performs an operation that utilizes the network-enabled resource through a local connection. An identifier of the network-enabled resource is obtained through the local connection. The roaming device communicates the identifier to a cloud service that is linked to the network-enabled resource. The roaming device obtains, from the cloud service, a link for accessing the network-enabled resource through the cloud service. An operation can then be performed in which the roaming device utilizes the network-enabled resource through the cloud service, using the link.

Still further, another example provides a system that includes one or more services and a roaming device. The one or more servers provide a cloud service that communicates with the network-enabled resource. The roaming device connects to the network-enabled resource over a local connection, and obtains, over the local connection, an identifier for the network-enabled resource. The identifier is communicated to the cloud service. The cloud service determines a link for the network-enabled resource, and communicates the link to the roaming device. The roaming device uses the link to access the network-enabled resource from over the Internet at one or more later instances.

Examples described herein recognize that conventional approaches typically require a user to obtain and enter an address for a web-enabled device in order to subsequently access the device through a cloud service. For example, many services require use of an email address that has numerous characters. Often the user has to enter the characters manually in order to successfully connect to the printer. In contrast to such approaches, examples described herein substantially automate the ability of a computing device to obtain the address for a resource such as a web-enabled printer. In particular, the computing device can connect to the resource through a local link and then use information from the local link to obtain the address of the resource through the cloud service. Subsequently, the computing device can retrieve the address of the resource from memory and then use that address to access the resource through the cloud service. The ability to acquire the address from the local link provides inherent authentication (e.g., user is presumably permitted to use the resource if he is locally connected). Furthermore, examples described automate the acquisition and use of the address for the network-enabled resource. This provides convenience to the user, who would otherwise have to expend effort to record and enter the address manually for the roaming device.

One or more examples described herein provide that methods, techniques and actions performed by a computing device are performed programmatically, or as a computer-implemented method. Programmatically means through the use of code, or computer-executable instructions. A programmatically performed step may or may not be automatic.

One or more examples described herein may further be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples such as described herein can be carried and/or executed. In particular, the numerous machines shown with examples provided herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets), and magnetic memory. Computers, terminals, network-enabled resources (e.g. mobile devices such as cell phones) are all examples of machines and devices that utilize processors, memory, and instructions stored on computer-readable mediums. Additionally, examples described herein can be implemented in the form of computer-programs, or a computer usable carrier medium capable of carrying such a program.

System Description

Figure 1:
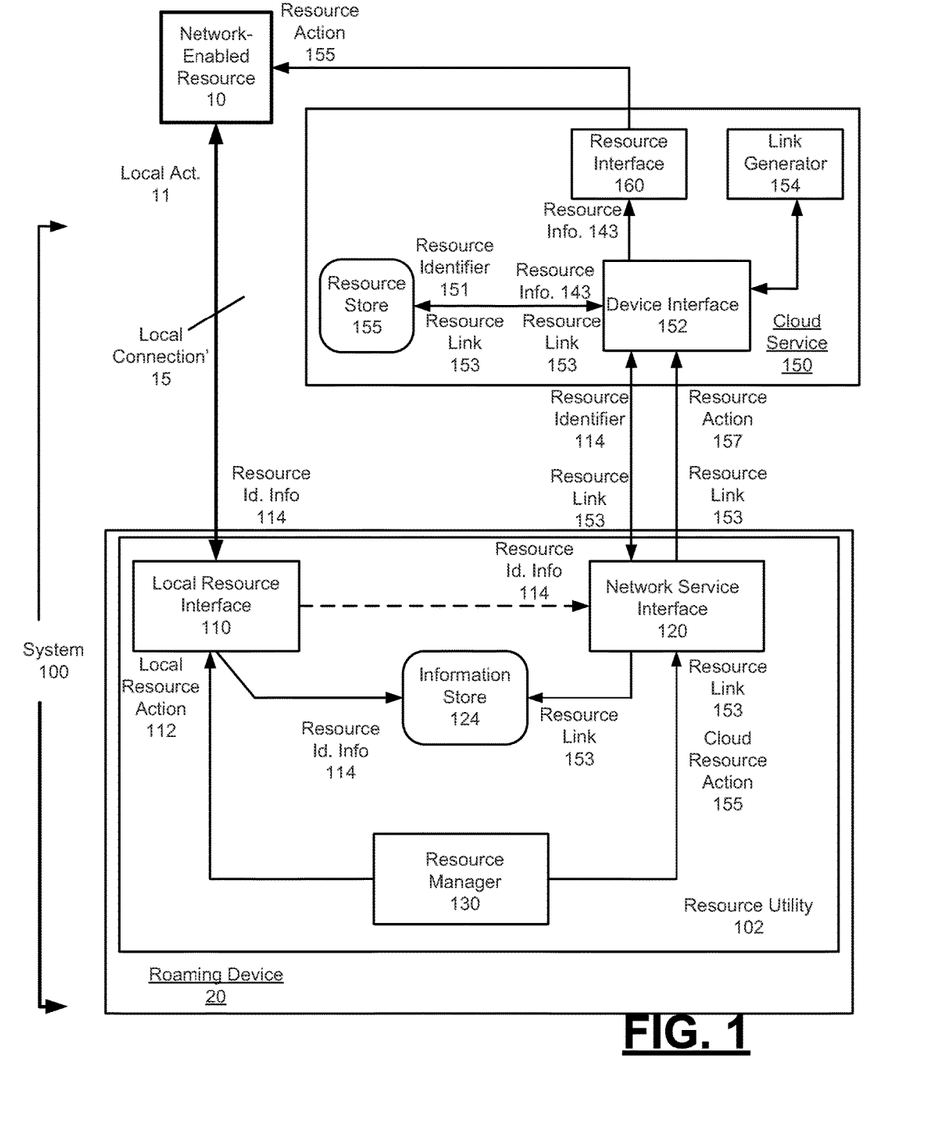
FIG. 1 illustrates an example system for enabling a roaming device to obtain a link for accessing a network-enabled resource through a cloud service.

FIG. 1 illustrates an example system for enabling a roaming device to obtain a link for accessing a network-enabled resource through a cloud service. A system 100 can include a resource utility 102 and a cloud service 150. The resource utility 102 can correspond to an application, program or process that operates on a roaming computing device 20. By way of example, a roaming computing device 20 on which resource utility 102 can operate include a cellular phone and/or messaging device (e.g., feature phone, smart phone, etc.), a tablet, netbook or other device that is both portable and wirelessly enabled for network communications. The cloud service 150 can be implemented by one or more servers, and can provide functionality (as described below) that can be accessed by a user at any point on the Internet. In some implementations, network-enabled resource 10 can correspond to a network enabled device, such as a web-based printer, scanner, copier, fax machine, multifunction machine (e.g., printer copier and fax), personal computer, video playback device (e.g., DVD), television or media recording device (e.g., digital video recorder (DVR)). In variations, network-enabled resource 10 can correspond to data or software, such as an application or a file directory.

In an example of FIG. 1, the network-enabled resource 10 may be linked with the cloud service 150. For example, the network-enabled resource 10 can be operated to subscribe to services or fulfillment orders from the cloud service 150 (e.g., ink refills, service calls). In one implementation, the network-enabled resource 10 includes browser or network communication functionality for communicating with a resource interface 160 of the cloud service 150. Additionally, the resource interface 160 can initiate (e.g., periodically poll) the network-enabled resource 10, based on services or functionality provided to the network-enabled resource 10 through the cloud service 150.

In an example of FIG. 1, resource utility 102 includes a local resource interface 110, a network service interface 120, and a resource manager 130. In one implementation, the local utility can correspond to an application, or suite of applications or application layer logic that execute on the roaming device 20. The local resource interface 110 can operate to interface with the network-enabled resource 10 using a local connection 15. The local connection 15 can correspond to, for example, a wireline or direct connection (e.g., through USB port), a direct wireless connection (e.g., Bluetooth, infrared), a Near-Field Communication ("NFC") link, or a local area network connection (e.g., through a Wireless Fidelity access point (802.11(b), 802.11(g) or 802.11(n))). In implementation, the resource utility 102 can operate through the local resource interface 110 to connect with and enable use of the network-enabled resource 10 when the roaming device 20 is in proximity to or otherwise locally connected with the network-enabled resource 10.

For example, the local resource interface 110 can enable a user of the roaming computing device 20 to specify an action 11 for the network-enabled resource 10 over the local connection 15. For example, the local resource interface 110 can signal and control the network-enabled resource 10 over the local connection 15. Alternatively, the local resource interface 110 can operate with other components that control and enable use of the network-enabled resource 10 in order to detect when such action 11 is performed.

In one implementation, the local resource interface 110 operates to obtain identifier information 114 from the network-enabled resource 10. The roaming device 20, can, for example, execute a local discovery routine to identify resources on a particular local domain (e.g., locate printers on a domain of a home network). The resource identifier information 114 can correspond to, for example, an identifier of the network-enabled resource (e.g., make or model, serial number, local domain name), as well as network location information. The location information can include information for locating the network-enabled resource 10 on the particular network domain (e.g., home network). Additionally, the resource identifier information 114 can correspond to credential or authorization data for a device such as roaming device 20 to use the network-enabled resource 10.

According to another aspect, the local resource interface 110 can retrieve identifier information 114 in response to the roaming device 20 utilizing the network-enabled resource 10 over the local connection 15 (e.g., roaming device performs the action 11 over the local connection to receive the identifier information 114). As another example, the network-enabled resource 10 can correspond to a web based printer, and the roaming device 20 can signal action 11 corresponding to a print job to the printer through a local connection 15 (e.g. home WiFi network). In one implementation, the local resource interface 110 retrieves the identifier information 114 in response to the action 11 being signaled to, and/or being performed (or completed) by the network-enabled resource 10. Depending on implementation, the local resource interface 110 can signal the resource identifier 114 to either the network service interface 120, or to information store 124.

The network service interface 120 can operate to communicate with the cloud service 150. When the local resource interface 110 obtains the resource identifier 114, the network service interface 120 can automatically (or programmatically in response to an event) communicate the resource identifier 114 to the cloud service 150. For example, network service interface 120 can retrieve resource identifier 114 from the information store 124. Alternatively, the network service interface 120 can receive the resource identifier 114 from the local resource interface 110.

In response to receiving the local resource identifier 114 via network service interface 120, cloud service 150 returns a resource link 153. In one implementation, the cloud service 150 includes the device interface 152 to handle communications between roaming devices and the cloud service 150. Multiple types of device interfaces 152 can be used to handle communications from different kinds of device platforms (e.g., device types and/or operating systems), as well as over different kinds of communication protocols or network mediums. In one implementation, the device interface 152 maintains or accesses a resource store 155 (e.g., list structure) that associates various resources at different locations (e.g., local printers of a group of users) with identifiers, and with links for locating the specific resource through the cloud service 150. As an alternative or variation, the cloud service 150 can employ a link generator 154 that generates the resource link 153 based on network identification information associated with the particular network-enabled resource 10. In such a variation, the resource identifier 114 can include network identification information (e.g., local network information for locating the resource 10 on the local domain), from which the resource link 153 can be generated. The resource store 155 can store and associate the resource identifier 114 and the resource link 154 with one another. In this way, each resource 10 can be associated with resource link 153, as well as information (e.g., local network information) for enabling the cloud service 150 to locate and communicate with the particular resource 10.

According to one aspect, the network service interface 120 of the roaming device 20 can receive the resource link 153, and store the resource link 153 with the information store 124. The information store 124 can thus store the resource identifier 113 and the resource link 153 for the specific network-enabled resource 10.

The resource manager 130 can control the manner in which the roaming device 20 accesses and utilizes the network-enabled resource 10. In one implementation, the resource manager 130 can include functionality for determining whether the roaming device 20 is remote or local to network-enabled resource 10. For example, resource manager 130 can interface with the WiFi controller of the roaming device 20 to determine whether the roaming device 20 is locally connected, or in sufficient proximity to the network-enabled resource 10, to use the local resource interface 110, and/or local discovery processes for obtaining identification information from connected devices of the corresponding network domain. Otherwise, the resource manager 130 can select to use the network service interface 120 for communicating with the cloud service 150 (e.g., application running on the roaming device 20 that uses Internet to connect to the cloud service 150).

In one implementation, resource manager 130 includes functionality for automatically detecting whether the network-enabled resource 10 is in sufficient proximity to the roaming device for establishing or using the local connection 15. Such functionality can be executed in response to an event, such as a user request or command to use the network-enabled resource 10. For example, the user may select to print a document from a roaming device by simply selecting an image of a printer, without specifying an address of the printer. The resource manager 130 can automatically determine whether the network-enabled resource 10, corresponding to the selected printer, is locally available, by for example, determining the local area network in use, and using information store 124 to determine whether the local network connection is that for the selected network-enabled resource 10.

If the network-enabled resource 10 is not locally connected, resource manager 130 can communicate with the network-enabled resource 10 using the network service interface 120. The network service interface 120 can respond to the resource manager 130 by retrieving the resource link 153 from the information store 124, and signaling the resource link 153 to the cloud service 150 in connection with a user specified action 157 or operation.

In turn, the cloud service 150 can use the resource link 153 to retrieve resource information 143 for identifying the particular resource 10. The resource information 143 can include the identifier for the network-enabled resource 10, as well as location information that can be utilized by the cloud service 150 in accessing and communicating with the network-enabled resource 10. In an example of FIG. 1, the resource information 143 can be used to communicate the action 157 to the network-enabled resource 10 via the cloud service 150.

On the roaming device 20, the network service interface 120 can retrieve the resource link 153 from the information store 124 automatically, in response to a user input to access or otherwise perform remote action 157 using the network-enabled resource 10. As a result, the user of the roaming device 20 does not have to specify characters, or provide data components that comprise the resource link 153 or network address for the network-enabled resource 10. In one implementation, the resource link 153 is retrieved and utilized automatically on the roaming device 20, in response to user input for the specific network-enabled resource 10. For example, the user can be displayed information corresponding to an identifier of the network-enabled resource 10. This information can be determined from, for the example, the resource identifier 114, which can be stored on the roaming device 20 in response to the roaming device 20 and the network-enabled resource 10 forming the local connection 15. In one implementation, a user's selection of an operation that utilizes the network-enabled resource 10 (e.g. print command) over the local connection 15 results in the roaming device 20 automatically obtaining the resource identifier 114 for use in determining the resource link 153 to the cloud service 150. In turn, the cloud service 150 utilizes the resource link 153 to locate the network-enabled resource, and to perform the remote actions 157 specified by the user. The resource identifier 114 can also provide a basis for displaying information to the user of the roaming device 20. For example, the cloud service 150 can pair the resource link 153 with a specific printer and network location, then use that information to communicate the remote action 157 of the user to the network-enabled resource 10.

In one example, the network-enabled resource 10 corresponds to a Web-enabled printer. The printer can have an established association with cloud service 150. The cloud service 150 can maintain a link for locating the printer over the Internet. In one implementation, the printer can periodically communicate with the cloud service 150 to enable remote communications from users (e.g., as described with examples), enable ink refill checks, status checks and or other functionality (e.g., enable images to be shared with other printers etc.). The user of the roaming device 20 can locally connected with the printer to print documents, pictures etc, using the printer. For example, the roaming device 20 can locate the printer over a local Wi-Fi connection. When locally connected, roaming device 20 can implement processes in which the identifier of the local printer is retrieved, then communicated to the cloud service 150 in order to determine a link for subsequently locating the printer through the cloud service.

The processes implemented by the roaming device 20 can be used to enable automatic and/or programmatic acquisition of link 153 for remotely accessing the printer through the cloud service 150. More specifically, the acquisition of link 153 can be implemented in a manner that is automatic, programmatic, and/or transparent to the user. Thus, for example, the user does not need to manually record the local identifier of the printer, nor does the user have to store or enter information corresponding to the network address of the printer (e.g., email address for printer). In some implementations, the characters that comprise the link 153 are graphically represented in atomic fashion, or are otherwise hidden to the user.

Subsequent to leaving the domain of the printer, the user can operate roaming device 20 to signal a print operation. When performing the operation, the user can select a printer without regard to the location of the roaming device 20 relative to the printer. Additionally, the user does not have to provide input that specifies the network address of the printer.

By way of example, the user can perform a print operation (e.g., print job) when local connected to a printer (e.g., on the local domain of the printer). The print operation on the local domain results in the user obtaining a link for remotely locating the printer through the cloud service 150. Subsequently, when the roaming device is remote to the domain of the printer (e.g., using Internet to connect to cloud service 150), the link for locating the printer is programmatically communicated to the cloud service 150 in connection with a second print job that the user specified from a location remote to the printer. The link locates the printer through the cloud service 150. By programmatically obtaining the link, the need for having the user to manually record the information for later use is eliminated.

Under one aspect, the user's experience in selecting the printer (or performing some other action) is substantially the same, regardless of whether the user accesses the printer through the local connection 15 or through the cloud service 150. Still further, the user experience can minimize user input for remotely accessing the printer. For example, the user can provide input that corresponds to the user selecting a printer (e.g., tapping a display of a tablet), or performing a print operation using a default printer that can be located locally or remotely to the location of the user.

Methodology

Figure 2:
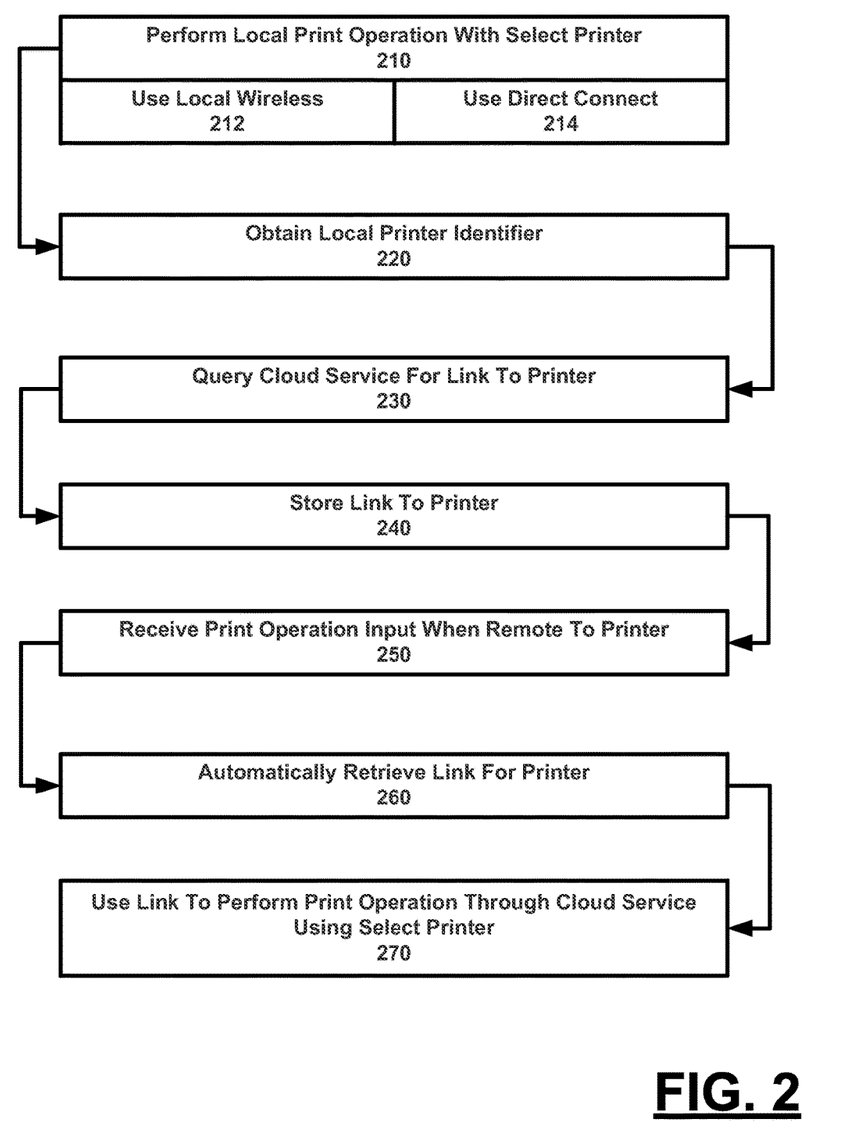
FIG. 2 illustrates an example method in which a roaming device obtains an address for accessing a network-enabled resource through a cloud service.

FIG. 2 illustrates an example method in which a roaming device obtains a link for accessing a network-enabled resource through a cloud service. A method such as described by an example of FIG. 2 can be implemented using components such as described by an example of FIG. 1. Accordingly, reference may be made to elements of FIG. 1 for purpose of illustrating suitable components or elements for performing a step or sub step being described.

In one implementation, a user utilizes the roaming device 20 to perform a local print operation on a printer (210). The local print operation can include a wireless network operation communicated over the domain of the printer (212). For example, a roaming device may link to a home network, and access the local printer to perform a print command. The local print operation can alternatively be made through direct connection, such as through a wireline connection, or through an inductive signal transfer (214).

In response to performing the operation, the roaming device 20 obtains identification information for the printer (220). Thus, in one example, the identification information is obtained automatically as a byproduct of the roaming device 20 utilizing the printer in a local setting or environment. In this regard, the local use of the printer can provide an inherent mechanism for authenticating the roaming device 20 in being able to access the printer through the cloud service 150. In addition to receiving identification information, the roaming device 20 may also receive credential information for authenticating its subsequent use of the printer.

As an alternative or variation to the print command, the roaming device
  can perform an alternative operation, such as operations corresponding to accessing the printer, checking printer or job status, check ink levels, running an application, or other operation. Still further, the roaming device 20 can simply detect presence of the printer, and communicate with the printer to obtain identification information for that printer.

Once the identification information is determined from the printer using the local connection, the roaming device 20 queries the cloud service 150 for a link to the printer (230). The cloud service 150 may predetermine and associate the resource link 153 with the printer based on the printers identification. Alternatively, the cloud service 150 can generate the resource link 153 in response to being queried.

The resource link 153 can be structured as a network address, a uniform resource locator (URL), an e-mail address or other data item that serves to locate the printer over the Internet. In addition to address, resource link 153 can also include or specify credential information for enabling the roaming device 20 and cloud service 150 (acting as a proxy for the roaming device 20) to access and utilize the printer.

The resource link 153 can be stored on the roaming device 20 for later use (240). For example, the roaming device 20 can obtain the link for the printer when the roaming device is on the local domain of the printer. The resource link 153 can be stored and accessed subsequently, even when the roaming device is remote to the domain of the printer.

In particular, the roaming device 20 can process a print operation request from a user at a later time, when the roaming device is no longer on the domain of, or otherwise locally connected to, the printer (250). For example, the roaming device
  can link to the Internet over a cellular connection when receiving a print command from the user.

In response to receiving the print operation request, the resource link 153 for the printer is automatically retrieved from memory (260). The roaming device 20 uses the resource link 153 to communicate the operation to the selected printer using the cloud service (270).

As described with an example of FIG. 2, the cloud service 150 can be configured to use the resource link 153 to locate the printer over the Internet, so as to communicate the desired operation to the printer. In response, the printer can perform the operation, and communicate the corresponding output either locally (e.g., generate hardcopy on the printer) or through the network (e.g., provide confirmation of print job). Furthermore, the cloud service 150 can return a response, output or other information to the roaming device 20 in response to the operation being requested from the roaming device.

EXAMPLE

Figure 3:
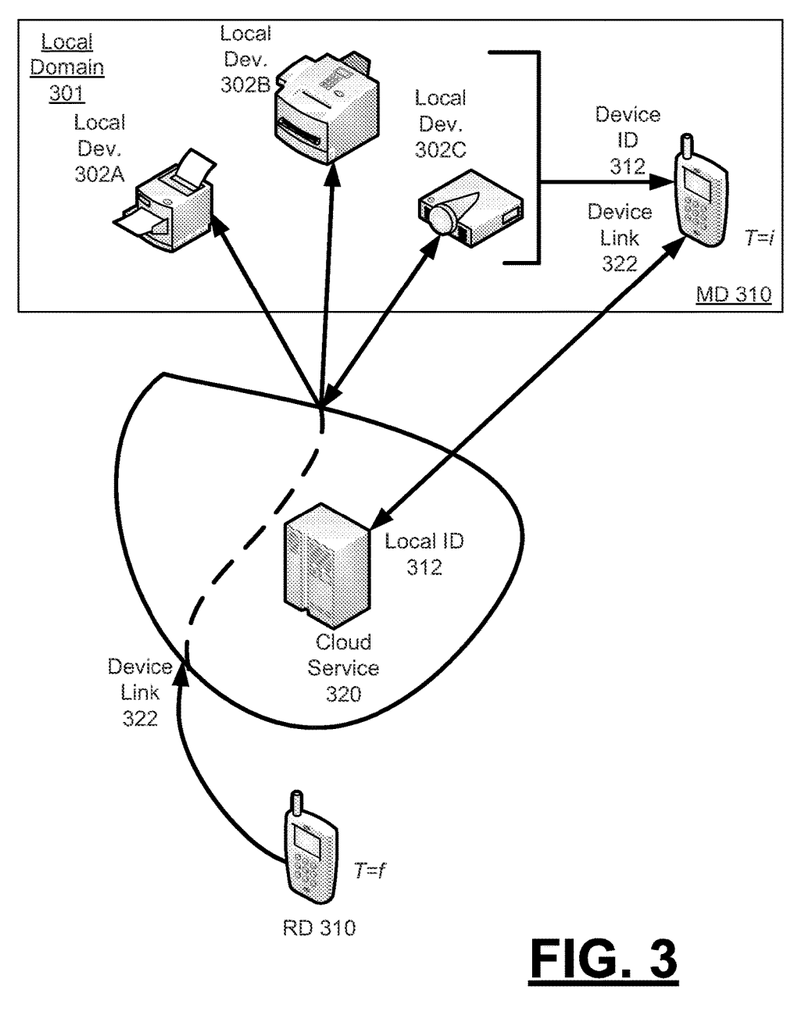
FIG. 3 illustrates an implementation in which a roaming device uses a cloud service to access a printer or similar device on a local domain.

FIG. 3 illustrates an implementation in which a roaming device uses a cloud service to access printer or similar device on a local domain. In the example shown, a local domain 301 includes one or more network enabled devices, such as a printer 302a, copier 302b, and projector 302c. In variations, other kinds of devices can be utilized in connection with examples described herein. In particular, televisions, personal computers, playback devices, DVRs, satellite dishes, appliances, home sensors and lighting equipment, and/or various other devices can be implemented as a network-enabled resource in accordance with examples such as described herein.

A roaming device 310 can operate in the local domain 301 to utilize one or more of the devices 302. For example, the roaming device 310 can (i) signal data for print to the printer, (ii) signal data for copying to the copier, and/or (iii) signal data for presentation to the projector. At an initial time (T=i) roaming device 310 can use the local area network connection (e.g., Wi-Fi) to access and use one or more of the devices 302. As a result of accessing the device 302 locally, the roaming device 310 receives device identifier 312. For example, the roaming device 310 can automatically obtain the device identifier 312 as an ancillary result to the roaming device performing an operation that utilizes one of the devices. In examples, roaming device 310 can perform various kinds of operations with the devices 302 on the local domain 301 in order to obtain the corresponding device identifiers 312.

The roaming device 310 can signal the local identifier 312 to the cloud service 320. In one implementation, the roaming device 310 can signal the identifier 312 to the cloud service 320 when the roaming device is resident on the local domain 301. The cloud service 320 can maintain the local identifier 312, and return to the roaming device a device link 322.

Subsequently (at T=f), when the roaming device 310 leaves the local domain 302, the roaming device 310 is able to use the device link 322 to access the corresponding device 312 on the local domain 301 via the cloud service 320. The cloud service 320 can respond to the device think 322 by locating the local domain, and locating the specific device on the local domain. Thus, for example, the device link 322 can be mapped to network location information that identifies the local domain 302 and the specific device on that domain. As mentioned with other examples, the cloud service 320 can have a pre-established association or relationship with the local domain, and/or with one or more devices on that domain. By way of example, a printer can utilize the cloud service 320 to receive print jobs, as well as to communicate status information regarding the performance and maintenance of the device 302 (e.g., check ink levels).

Hardware Diagram

Figure 4:
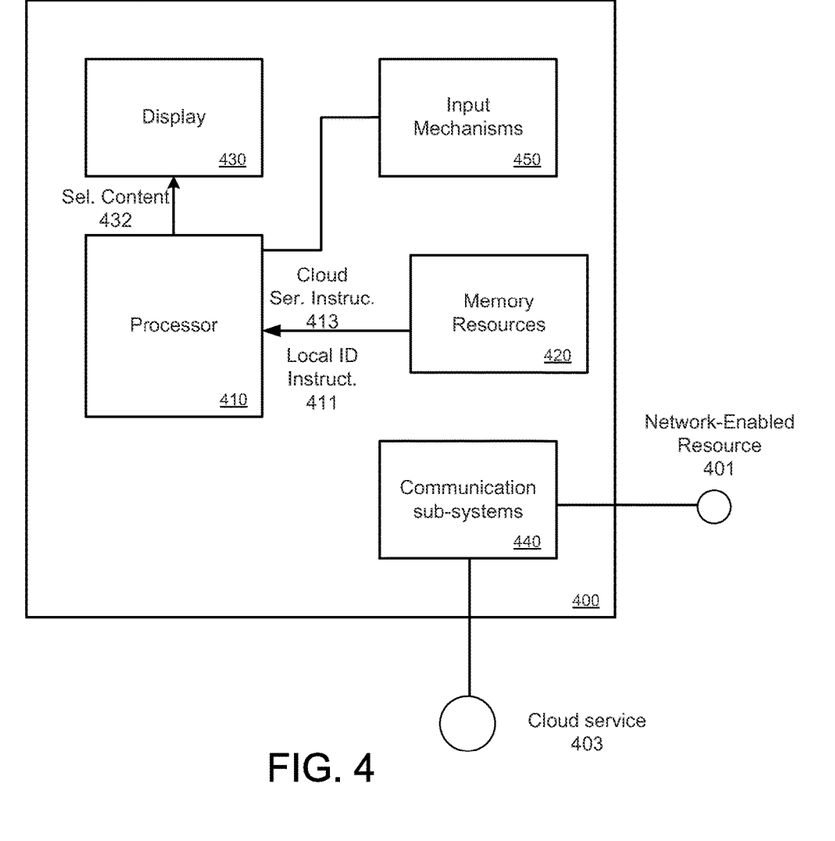
FIG. 4 illustrates an example hardware diagram for a computer system upon which examples described herein may be implemented.

FIG. 4 illustrates an example hardware diagram for a computer system upon which embodiments described herein may be implemented. For example, in the context of FIG. 1, the roaming device 100 and cloud service 150 of system 100 can each be implemented using a computer system such as described by FIG. 4. According to embodiments, each computing device 400 can correspond to one of a mobile computing device (e.g., cellular device that is capable of telephony, messaging, and data services), tablet, laptop, netbook, media playback device, smart television, media playback device, projector, camera, or personal computer. The computing device 400 includes a processor 410, memory resources 420, a display device 430, one or more communication sub-systems 440, and an input mechanism 450.

The processor 410 is configured with software and/or other logic to perform one or more processes, steps and other functions described with embodiments, such as described by examples of FIGS. 1-3, and elsewhere in this document. Processor 410 can be configured, with instructions and data stored in the memory resources 420, to implement functionality such as described with roaming device 20. In particular, the memory resources 420 can store (i) local identification instructions 411, executable by the processor 410 to communicate locally with a network-enabled resource to obtain identification information for that resource, and (ii) cloud service instructions 413, executable by the processor 410 to use the identification information in obtaining a link for remotely accessing the resource through the cloud service 150 (see FIG. 1). The communication sub-system 440 can include a local communication port to communicate with the network-enabled resource locally (e.g., when executing local identification instructions 411). The local communication sub-system 440 can include, for example, a WiFi port, a Bluetooth port, or a Near-Field Communication (NFC) port. The communication sub-system 440 can also include a wireless communication port (e.g., cellular) to communicate with cloud service 403 (e.g., when executing cloud service instructions 413).

The processor 410 can provide selection content 432 to the display 430 by executing instructions and/or applications that are stored in the memory resources 420. In one implementation, the selection content 432 can correspond to an image or set of images for printers that the user can access either locally, or remotely through the cloud service. When accessing resources remotely, the user does not have to recall or otherwise manually input information for locating those resources.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for using a network-enabled printer on a roaming device, the method being implemented by one or more processors of the roaming device and comprising:
    obtaining, from a prior interaction with the network-enabled printer over a local network connection of a local network, information for accessing the network-enabled printer, wherein obtaining the information for accessing the network-enabled printer is performed automatically while the roaming device is using the local network connection to communicate with the network-enabled printer;
    responding to a user command to operate the network-enabled printer, determining whether the roaming device is sufficiently proximate to the network-enabled printer over the local network connection; and
    in response to a determination that the roaming device is not sufficiently proximate to the network-enabled printer over the local network connection, transparently communicating the user command and the information for accessing the network-enabled printer to a cloud service to cause the cloud service to operate the network-enabled printer from the cloud service.

2. The method of claim 1, wherein obtaining the information for accessing the network-enabled printer is performed automatically in response to the roaming device performing an operation that utilizes the network-enabled printer using the local network connection.

3. The method of claim 1, wherein obtaining the information for accessing the network-enabled printer is performed automatically as an ancillary result of the roaming device performing an operation to use the network-enabled printer over the local network connection.

4. The method of claim 3, wherein the information obtained for accessing the network-enabled printer includes one or more of a uniform resource locator or an email address of the network-enabled printer.

5. The method of claim 1, further comprising using the information obtained for accessing the network-enabled printer to communicate with the network-enabled printer directly, without requiring input from a user as to any aspect of connecting to the network-enabled printer.

6. A non-transitory computer-readable medium storing instructions that when execute cause a processor of a roaming computing device to:
    interact with a network-enabled resource through a local network connection of a local network;
    obtain, from the interaction, information for accessing the network-enabled resource from a cloud service, wherein the information for accessing the network-enabled printer is obtained automatically while the roaming computing device is using the local network connection to communicate with the network-enabled resource;

in response to receiving a user command to operate the network-enabled resource, determine whether the roaming computing device is sufficiently proximate to the network-enabled resource via the local network connection; and in response to a determination that the roaming computing device is not sufficiently proximate to the network-enabled resource, transmit the user command and the information for accessing the network-enabled resource to the cloud service to cause the cloud service to operate the network-enabled resource from the cloud service.

7. The non-transitory computer-readable medium of claim 6, wherein the instructions are to cause the processor of the roaming computing device to:

in response to a determination that the roaming computing device is sufficiently proximate to the network-enabled resource, directly communicate with the network-enabled resource using the information for accessing the network-enabled resource.

8. The non-transitory computer-readable medium of claim 6, wherein the network-enabled resource is a printer, and the user command is a print selection.

9. The non-transitory computer-readable medium of claim 8, wherein the determination that the roaming computing device is not sufficiently proximate to the network-enabled resource includes a determination that the printer is external to the local network of the roaming computing device.

10. The non-transitory computer-readable medium of claim 6, wherein the information for accessing the network-enabled resource includes a uniform resource locator which includes a credential associated with the roaming device.

11. The non-transitory computer-readable medium of claim 6, wherein the instructions are to cause the processor of the roaming computing device to obtain the information for accessing the network-enabled resource from a storage at the roaming computing device after determining that the roaming computing device is not sufficiently proximate to the network-enabled resource.

12. The non-transitory computer-readable medium of claim 6, wherein the information for accessing the network-enabled resource includes one or more of a serial number, manufacturer, part number, or local area network link.

13. The non-transitory computer-readable medium of claim 6, wherein subsequent to transmitting the user command and information for accessing the network-enabled resource to the cloud service, the processor of the roaming computing device is to receive a result of the user command from the network-enabled resource.

14. A roaming device comprising:
a processor; and
a memory storing instructions that when executed cause the processor to:
obtain, from a prior interaction between the roaming device and a network-enabled printer over a local network connection of a local network, information for accessing the network-enabled printer, wherein the processor is to obtain the information for accessing the network enabled resource automatically as an ancillary result of the roaming device performing an operation to use the network-enabled printer over the local network connection;

in response to a user command to operate the network-enabled printer, determine whether the roaming device is sufficiently proximate to communicate with the network-enabled printer over the local network connection; and in response to a determination that the roaming device is not sufficiently proximate to the network-enabled printer, transparently communicate the user command and the information for accessing the network-enabled printer to a cloud service to cause the cloud service to operate the network-enabled printer from the cloud service.

15. The roaming device of claim 14, wherein, in response to a determination that the roaming device is sufficiently proximate to the network-enabled printer, the instructions are to cause the processor to operate the network-enabled printer using the local network connection.

16. The roaming device of claim 14, wherein, in response to the determination that the roaming device is not sufficiently proximate to the network-enabled printer, the instructions are to cause the processor to obtain the information for accessing the network-enabled printer stored at the roaming device to send to the cloud service.

17. The roaming device of claim 14, wherein the information for accessing the network enabled resource includes a uniform resource locator, the uniform resource locator including a credential associated with the roaming device.

18. The roaming device of claim 14, wherein the processor is to use the information for accessing the network-enabled printer to communicate with the network-enabled printer directly, without requiring input from a user as to any aspect of connecting to the network-enabled printer.

* * * * *

UNITED STATES PATENT AND TRADEMARK OFFICE
CERTIFICATE OF CORRECTION

PATENT NO. : 10,203,923 B2
APPLICATION NO. : 14/764896
DATED : February 12, 2019
INVENTOR(S) : Lonnie D. Mandigo et al.

Page 1 of 1

It is certified that error appears in the above-identified patent and that said Letters Patent is hereby corrected as shown below:

In the Claims

In Column 12, Line 13, in Claim 14, delete "network enabled" and insert -- network-enabled --, therefor.

In Column 12, Line 40, in Claim 17, delete "network enabled" and insert -- network-enabled --, therefor.

Signed and Sealed this
Twenty-sixth Day of November, 2019

Andrei Iancu
*Director of the United States Patent and Trademark Office*